United States Patent
Corti et al.

(10) Patent No.: US 7,455,446 B2
(45) Date of Patent: Nov. 25, 2008

(54) CO-INJECTION MIXING METHOD AND APPARATUS

(75) Inventors: Maurizio Corti, San Fermo Della Battaglia (IT); Piero Corradi, Saronno (IT); Carlo Fiorentini, Saronno (IT)

(73) Assignee: Afros S.p.A., Caronno Pertusella (VA) (IT)

( * ) Notice: Subject to any disclaimer, the term of this patent is extended or adjusted under 35 U.S.C. 154(b) by 447 days.

(21) Appl. No.: 10/534,004

(22) PCT Filed: Nov. 3, 2003

(86) PCT No.: PCT/EP03/12222

§ 371 (c)(1),
(2), (4) Date: May 5, 2005

(87) PCT Pub. No.: WO2004/041494

PCT Pub. Date: May 21, 2004

(65) Prior Publication Data

US 2006/0104155 A1    May 18, 2006

(30) Foreign Application Priority Data

Nov. 5, 2002    (IT)    ............ MI2002A2336

(51) Int. Cl.
*B01F 5/04* (2006.01)
*B29B 7/76* (2006.01)

(52) U.S. Cl. .................. 366/162.5; 422/133

(58) Field of Classification Search ............ 366/159.1, 366/162.4, 162.5, 167.1, 173.1; 422/131, 422/133–135
See application file for complete search history.

(56) References Cited

U.S. PATENT DOCUMENTS

| | | | |
|---|---|---|---|
| 4,141,470 A * | 2/1979 | Schulte et al. | ............ 422/133 |
| 4,314,963 A | 2/1982 | Boden et al. | |
| 4,332,335 A | 6/1982 | Fiorentini | |
| 4,442,070 A * | 4/1984 | Proksa et al. | ............ 422/133 |
| 4,477,191 A | 10/1984 | Ersfeld et al. | |

(Continued)

FOREIGN PATENT DOCUMENTS

DE    32 13 153    10/1983

(Continued)

OTHER PUBLICATIONS

Patent Abstracts of Japan vol. 0050, No. 72 (M-068), May 14, 1981 & JP 56 021840 A (Tawada Takeshi), Feb. 28, 1981 abstract.

*Primary Examiner*—Charles E Cooley
(74) *Attorney, Agent, or Firm*—Young & Thompson

(57) ABSTRACT

A method and device (10) for mixing polyurethane-forming liquid chemical components for the production of polyurethane foams, in which positive use is made of the turbulency and swirling action caused by the injection of pressurized jets of chemical components, in order to provide a methodology tending to improve the mixing processes by impingement and by the turbulency induced by a pressure drop in conventional self-cleaning apparatuses.

31 Claims, 9 Drawing Sheets

U.S. PATENT DOCUMENTS

| | | | |
|---|---|---|---|
| 4,486,102 A | 12/1984 | Thiele et al. | |
| 4,510,120 A * | 4/1985 | Bauer | 422/133 |
| 4,608,233 A | 8/1986 | Fiorentini | |
| 4,802,770 A | 2/1989 | Fiorentini | |
| 5,063,027 A * | 11/1991 | Schneider | 422/133 |
| 5,143,946 A | 9/1992 | Proksa et al. | |
| 5,157,059 A * | 10/1992 | Bauer et al. | 521/163 |
| 5,270,014 A | 12/1993 | Bauer et al. | |
| 5,453,249 A * | 9/1995 | Proksa et al. | 422/133 |
| 2004/0257908 A1* | 12/2004 | Breuker et al. | 366/162.5 |
| 2006/0104155 A1* | 5/2006 | Corti et al. | 366/162.5 |
| 2008/0094936 A1* | 4/2008 | Corti | 366/162.4 |

FOREIGN PATENT DOCUMENTS

| | | |
|---|---|---|
| DE | 33 40 889 | 6/1985 |
| DE | 35 02 763 | 8/1985 |
| DE | 36 12 125 | 10/1987 |
| EP | 0070486 A1 * | 1/1983 |
| EP | 0 093 356 | 11/1983 |
| EP | 0 504 874 | 9/1992 |
| GB | 2129324 A * | 5/1984 |

* cited by examiner

CO-INJECTION MIXING METHOD AND APPARATUS

BACKGROUND OF THE INVENTION

This invention refers to a method and an apparatus for mixing liquid chemical components, in particular for the production of polyurethane foams, in which positive use is made of the turbulency and swirling action caused by the injection of pressurized jets of chemical components, in order to provide a methodology tending to improve the mixing processes by impingement and by the turbulency induced by a pressure drop in conventional self-cleaning apparatuses.

PRIOR ART

In the production of polyurethane foams or moulded parts in rigid or flexible polyurethane material, two or more reactive chemical components, with a low boiling agent and/or additives, are mixed in special apparatuses according to known methods; the resulting reactive mixture is injected into a mould or poured on a substrate, where rapidly reacts to form a polyurethane foam slabs or moulded pieces in polyurethane material.

There are basically two mixing technologies, and namely: a first mixing method at low pressure, in the range of a few dozen bars or less, consisting in feeding the chemical components into a mixing chamber where they are thoroughly mixed by the mechanical action of a stirrer According to another mixing method, so-called by "impingement", the chemical components are fed at high pressures, equivalent to or higher than 100-150 bars (10-15 MPa) and separately injected into a mixing chamber at such high speed and kinetic energy, as to cause them to mix by impingement and turbulency of the resulting flows, after the jets of the individual components have crossed in a collision area.

This invention tends to improve this second type of technology Self-cleaning type mixing apparatuses, normally also referred to as high-pressure mixing apparatuses or mixing heads have been used for some years and are described in a number of prior documents, for example in U.S. Pat. Nos. 4,332,335, 4,477,191, 4,608,233 and 4,802,770.

The known high-pressure mixing apparatuses, require a separate injection of the single components into a mixing chamber, through respective injection nozzles, feeding the individual components at different high pressures, ranging for example from 100 to 300 bars (10 to 30 MPa) in order to convert the high pressure energy with which each single component is fed, into a likewise high kinetic energy of the jets which mix by impingement and by the turbulency induced by collision with one another and against the internal walls of the mixing chamber.

Even though the conventional high-pressure mixing apparatuses are structurally simple and appreciated for several applications, thanks to their good mixing and self-cleaning characteristics, they nevertheless present a number of limits and drawbacks due to the difficulty in improving their efficiency, in particular in completing an intimate mixing of the chemical components, and in keeping a stoichiometric ratio at the beginning of the injection step.

In the past, attempts were made to obviate such limitation by adopting particular devices for unbalancing the pressures, or by making use of members for throttling the outlet aperture of the mixing chamber, post-mixing chambers and/or devices, all of which tended to functionally and structurally complicate the apparatus.

In particular, the mixing efficiency and the maintenance of the correct stoichiometric ratio in these apparatuses, are depending on the setting and control of the pressure at which each single component is fed; consequently, their chemical ratio is particularly critical especially during initial and final mixing steps. In fact, the pressure setting operations by means of the injection nozzles are critical also when carried out by an expert operator, require good manual skills, take a long time to be carried out, and normally call for preliminary tests for setting up the entire installation. Moreover, whenever it is necessary to mix chemical components which are highly viscous, or incompatible with one another from the standpoint of solubility and miscibility, such as for example a lipophilic component and a hydrophilic component, in general very high feed pressures must be used in order to obtain the required mixing; consequently a greater energy consumption is requested and greater structural and functional complications for the entire feeding system for the components to the mixing apparatus.

Lastly, even though the mixing conditions can be improved by reducing, for example, the cross-sectional dimensions of the mixing chamber, because of the need to provide the necessary spacing and seals between the single injection nozzles, and to limit its overall dimensions, in the conventional high-pressure apparatuses it is not possible to fall below certain dimensional limits of the cross-sections of the mixing chambers, and consequently improve the mixing efficacy.

In general, therefore, in apparatuses of the aforementioned kind, it is difficult and complicated to maintain sufficiently satisfactory mixing conditions in terms of proportioning, pressure and optimal mixing of the components, especially upon variation in the flow rates, and during transient phenomena, as to produce a desired and complete reaction process, an adequate state of laminar flow ability of the mixture, and an adequate speed of polymerisation once the components have been mixed and injected into the cavity of a mould or distributed onto a substrate.

OBJECTS OF THE INVENTION

The main object of this invention is to provide a method for mixing reactive chemical components, in the production of polyurethane foams and moulded articles in polyurethane material, which makes use, in a new and original way, of the turbulency and impingement mixing technology, by means of a self-cleaning mixing apparatus suitably modified to provide an improved and easier control of the metering and mixing conditions, by using a comparatively less pressure drop than in the conventionally mixing apparatuses, thereby saving a substantial amount of energy and achieving a better mixing degree.

A further object of the invention is to provide a mixing method as defined above, whereby it is possible to use a same pressure drop for injecting the various components into an impingement and turbulence mixing chamber; this makes it possible to mix liquids having very difficult or considerably different miscibility properties from one another, to obtain an intimate mixing and improved mixing degree.

The mixing method according to this invention can be used with any polyurethane formulation, also containing suspended particles and/or dissolved or nucleated gases; advantageously, it can be used for mixing highly viscous or mutually incompatible liquid components, in that it enables the mixing to be optimised by operating with low feeding pressure values, for example, 40-50% lower than those required by the conventional high-pressure mixing apparatuses.

All this results in greater operating reliability, considerable saving in terms of energy and management, and greater simplification of the apparatus, the entire feeding and metering system for the components, and the setting of the mixing conditions.

A further object is to provide a mixing apparatus particularly suitable for carrying out the method indicated above, which constitutes an alternative to the conventional high-pressure mixing apparatuses.

A still further object of the invention is to provide a high or medium pressure mixing apparatus, by means of which it is possible to carry out a controlled metering and mixing of the various components, especially at the beginning and at the end of each mixing step, thanks to the possibility of feeding all the components into the mixing chamber simultaneously and in a synchronised, quick and repetitive way, without requiring excessively high pressures, by eliminating the so-called pre-flow conditions which occur with the conventional apparatuses.

All this results in the greater structural and functional simplicity of the mixing apparatus, and greater simplicity in setting the injection pressure, since the mixing is efficacious even with high percentages of pressure losses along the feeding lines for the single components; greater efficacy is also achieved due to the possibility of using mixing chambers having such extremely reduced dimensions, as to promote improved mixing conditions.

A still further object of the invention is to provide a method and a mixing apparatus of the type defined above, by means of which it is possible to adjust the injecting conditions for the components into a mixing chamber, simultaneously and conjointly for all the components, and in which the various jets which cross and collide or impinge with one another and/or against the walls of the mixing chamber, share in common and present the same kinetic energy and turbulency, being subject during the injection to a same pressure drop.

A still further object is to provide a high and/or medium pressure self-cleaning mixing head or apparatus, by means of which it is possible to use suitable outflow apertures for the jets towards the mixing chamber, of such kind as to achieve the conversion of the pressure energy into kinetic energy and high turbulence for the mixing, thereby positively using the energy into the individual jets for mixing during the injection step.

What basically is distinguishing this invention, is the possibility of effectively flowing the chemical components in a jumbled condition under a same pressure value and partially mixing the various components by means of the swirling and turbulent motions of the chemical components as they are injected into the mixing chamber, and subsequently completing the mixing by impingement.

A still further object of the invention is to provide a mixing apparatus of the type described above, whereby it is possible to simultaneously and also automatically adjust and setting a with a single operation the pressure drop for injection of the components into the mixing chamber, and change the total flow while easily maintaining mixing conditions suitable for all the components.

BRIEF DESCRIPTION OF THE INVENTION

All the above is achievabieby means of a method for mixing liquid chemical components in the production of polyurethane foams or moulded parts, as well as with a mixing device or a mixing apparatus.

More precisely, according to a first aspect of the invention, a mixing method for mixing chemically reactive liquid components has been provided, according to which at least a first and a second chemical components are fed under pressure conditions and mixed into a mixing chamber, and in which the resulting mixture is made to flow towards a delivery duct, comprising by the steps of:

feeding metered quantities of the chemical components into a common pressure and feeding chamber in which the chemical components are at a same common pressure and flow together toward at least one injection restriction or orifice; and co-injecting the jumbled chemical components into the mixing chamber, through said at least one injection orifice to cause intimate mixing by impingement and turbulency inside the mixing chamber of the mixing device.

The chemical components are introduced or fed into the common pressure and feeding chamber from separate ports and flow in common and at a pressure equal to or higher than 30 bars (3 MPa), preferably ranging from 40 to 160 bars (4 to 16 MPa), by appropriately adjusting the cross sectional areas of the injection restriction/s or orifice or orifices, in relation to the flow rates and characteristics of the chemical components to be mixed. By adjusting the cross sectional area of the restrictions or orifices the common pressure in the common pressure and feeding chamber may be consequently adjusted. The pressure into the common pressure and feeding chamber in which the chemical components are fed and flowing brought together in a jumbled condition, is lower than the pressures required for feeding each single component to the injectors of a conventional mixing apparatus, the injectors of which must be specifically and consequently adjusted for each single component; this will result in a more simple operation and possibility to better adjust the mixing ratio.

For the scope of the present invention the "common pressure and feeding chamber" means that the chemical components are introduced separately into the feeding chamber where they flow not yet mixed in an untidy or jumbled condition toward one or more restrictions or orifices where they get in common a complete and very fine turbulence to be mixed.

According to a further feature of the invention a mixing device has been provided for mixing reactive chemical components, comprising;

a common pressure and feeding chamber;

a mixing chamber in fluid communication with the common pressure and feeding chamber, and opening towards an outlet duct;

said common pressure and feeding chamber having inlet aperture for separate feeding of the chemical components, and being conformed for maintaining the chemical components, at a same pressure and conveying them not yet mixed toward at least on injection restriction or orifice;

said least one injection restriction or orifice being conformed and arranged between the common pressure and feeding chamber and the mixing chamber for co-injection of the chemical components into the mixing chamber of the mixing device.

Preferably, a throttling member is provided for restricting the sectional flow area of the injection restriction or orifice, having a shaped fore end partially extending into an inlet aperture of the mixing chamber, the fore end of the flow throttling member and the inlet aperture of the mixing chamber being conformed and disposed to form one or more narrow injection restriction or orifices.

The flow throttling member is made axially movable and may be adjustably positioned in order to change the cross sectional area of the flow passage of the injection restriction or orifice or orifices, and to adjust the pressure inside the common pressure and feeding chamber, as well as to change the pressure drop caused by the jet or jets of the jumbled chemical components, and consequently to adjust the kinetic energy and the shape of the eddies of the jets themselves; in this way it is possible to change and adjust the mixing efficiency of the apparatus.

A cleaning member for cleaning the common pressure and feeding chamber and to allow a separate re-circulation of the chemical components, in the form of a spool having a longitudinal bore, slides coaxially to and guides the flow throttling member. The cleaning member for the common pressure and feeding chamber is movable between a backward position in which it opens the inlet apertures for the components, and a forward position in which it closes said inlet apertures and eject the residue of the chemical components which remain in the common pressure and feeding chamber at the end of each mixing step, while simultaneously re-circulating each single component in a separate state.

In this connection, the bottom of the common pressure and feeding chamber and the fore end of the cleaning member present matching surface means appropriately shaped to conform to each other to completely eject the residual chemical material when they are brought into contact.

The disposition and conformation of the common pressure and feeding chamber, the mixing chamber, the fore end of the throttling member, a post-mixing chamber wherever required, and an outlet duct for the mixture, can be of any kind, provided they are suitable for the intended purpose.

For example, according to a preferential embodiment, the common pressure and feeding chamber and the mixing chamber are axially aligned; in this case, the flow throttling member can be adjusted and moved axially between a backward position, for adjusting the cross sectional area of the injection orifice or orifices, and a forward position for closure and cleaning of the mixing chamber.

The axially aligned disposition of the common pressure and feeding chamber, the mixing chamber, and the longitudinally movable cleaning members, makes it possible to obtain a large-sized annularly-shaped jumbling chamber, and a mixing chamber of a considerably reduced diameter, for example having a dimension of the cross sectional area of an order smaller than that of a mixing chamber of conventional type; this helps to considerably improve the mixing which can thus take place under high turbulency conditions.

Since in the common pressure and feeding chamber the chemical components come only partially into contact with one another, and are consequently less subject to start the chemical reaction, the cleaning of the common pressure and feeding chamber is therefore less critical.

It is nevertheless advantageous to contemplate the use of a sliding cleaning member in the common pressure and feeding chamber which simultaneously performs the squeezing out of the residual components and close of the inlet apertures for the components; the cleaning member is preferably connected to a hydraulic control cylinder which can be selectively operated with respect to a hydraulic control cylinder of the throttling and cleaning member of the mixing chamber.

In addition to perform such function, the cleaning member of the common pressure and feeding chamber can also carry out supplementary working functions; for example, it can be provided with suitable longitudinal or circumferential slots, or holes through which the single components can flow towards recirculation apertures or ducts comprising pressure control valves.

A post-mixing chamber can be also provided downstream to the mixing chamber, in which the residual kinetic energy of the resulting mixture is exploited to improve the mixing.

Furthermore, the mixing chamber can be disposed at right angle or form a different angle with the axis of the post-mixing chamber and/or with the axis of the outlet duct, for example ranging from 30° to 150°.

The axis of the mixing chamber can be disposed on the same plane or on a skew with respect to the axis of the post-mixing chamber and/or the outlet duct.

According to another feature of the invention, the cleaning member for cleaning the mixing chamber is preferably in the form of a cylindrical pin ending at its fore end with a flat front surface, or with slanted or differently shaped flat surfaces, which may also be curved; in turn, at the rear end of the mixing chamber some side walls may be provided for conveying the flow of components, disposed according to one or more slanted flat surfaces; for example, said slanted surfaces may be provided at the rear end of a bush member comprising the mixing chamber, which perfectly matches with corresponding slanted flat surfaces at the fore end of the movable cleaning member for the common pressure and feeding chamber.

According to several preferential embodiments, the fore end of the movable cleaning member for the common pressure and feeding chamber and the rear end of the bush member of the which corresponds to the fore end of the common pressure and feeding chamber, may present one or more opposite matching surfaces variously disposed and slanted with respect to one another, and with respect to the longitudinal axis of the two chambers.

For example they may lie on slanted and radially oriented planes, angularly spaced apart from one another; in this way, when the flow throttling member is in its backward position, at the inlet side of the mixing chamber one or more narrow co-injection orifices for the components are provided, in relation to the number of the slanted surfaces at the bottom of the common pressure and feeding chamber. For example, the opposite ends of the common pressure and feeding chamber and of the corresponding cleaning rod member may have one slanted surface only, lying a cross plane, or two V-shaped slanted surfaces, or four or more slanted surfaces, in opposing pairs, slanting in opposite directions, as described further on. The inclination of each surface, with respect to the longitudinal axis of the common pressure and feeding chamber, can be included in a wide range of values, preferably from 15° to 75°, greater or lesser, according to need.

In substitution of the flat surfaces, concave and/or convex and/or differently shaped surfaces can also be used.

According to a further feature of the invention, the cleaning member of the mixing chamber is in the form of an axially movable pin, the fore end of which may be provided with a flat front surface, disposed at right angle to the longitudinal axis of the mixing chamber, or with a concave or differently shaped surfaces, depending on the axial or side disposition of the mixing chamber with respect to the outlet duct. The backwards position of the movable pin can be made axially adjustable so as to change the cross-sectional area of the injection orifice or orifices, and consequently the pressure existing in the common pressure and feeding chamber.

According to a further feature of the invention, the adjustment of the position of the throttling and cleaning pin member of the mixing chamber, and consequently the adjustment of the cross sectional area of the injection restrictions or orifices, upon which the efficiency of the mixing depends, can be carried out either manually, or in a controlled way by means of electromechanical or electrohydraulic actuators appropriately controlled by a processing unit; in this way it is possible to optimise the pressure drop and, therefore, the efficiency of the mixing upon changes in the flow rate, physical conditions and number of components to be mixed.

The apparatus according to the invention, in addition to permitting an efficient mixing of several liquid components, fed in stoichiometric ratios by means of an accurate metering system, is also suitable for use with the remote control of the parameters of a mixing process; this is particularly advantageous whenever the production of the polyurethane material requires changes and modifications in the metered quantities, or the addition or elimination of one or more components between a mixing phase and the next one, in order to give to the end product different characteristics, or whenever it is necessary to modify the pressure conditions in the common pressure and feeding chamber, or for compensating changes in viscosity of the liquid components to be mixed.

For the purpose of the present invention the term "common" when referred to the pressure and feeding chamber and the injection orifice or orifices of the apparatus, means that all the components are merely fed and introduced into a same chamber, and conjointly fed and injected through a same common orifice.

The invention also makes it possible to obtain an outflow of the final mixture with a desired laminar condition, so as to avoid formation of splashes or swirling at the outlet of the delivery duct.

BRIEF DESCRIPTION OF THE FIGURES

These and further features of the method and the apparatus according to the invention, will be more clearly evident from the following description with reference to the accompanying drawings, in which.

DETAILED DESCRIPTION OF THE INVENTION

The general characteristics of the method and the apparatus according to the invention, will be described hereunder with reference to the figures from 1 to 9 which represent a first preferential embodiment.

Figure 1:
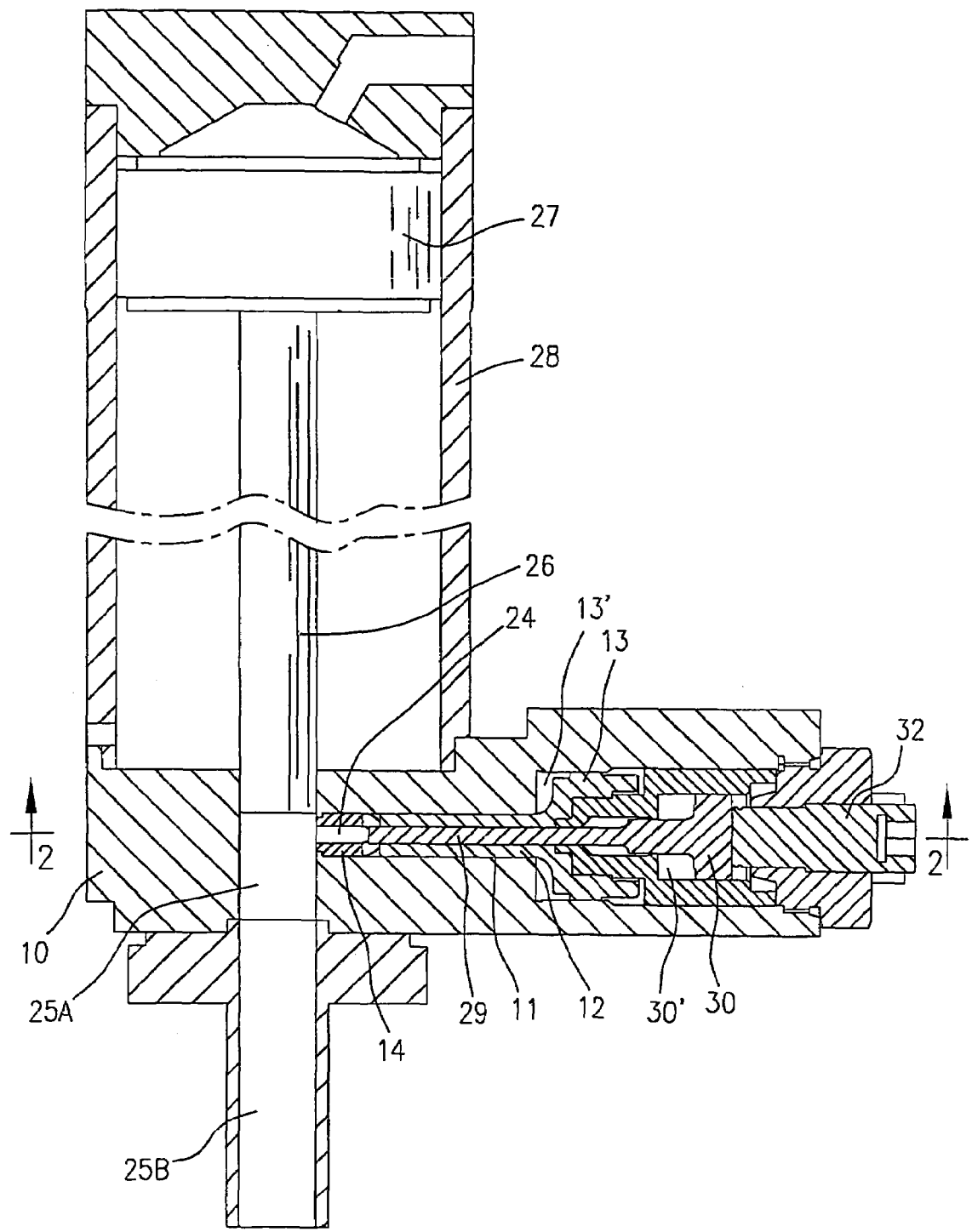
FIG. 1 shows a longitudinal cross-sectional view of a mixing apparatus according to a first preferential embodiment of the invention.
Figure 2:
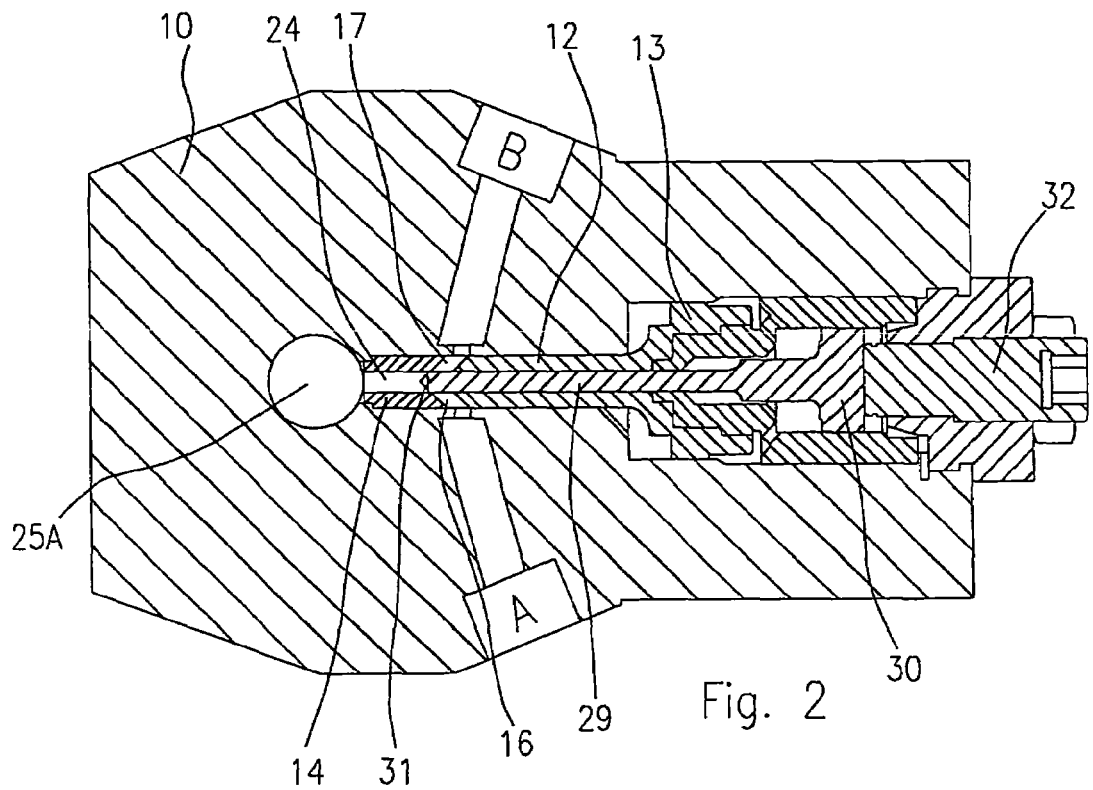
FIG. 2 shows a cross-sectional view along the line 2-2 of FIG. 1.
Figure 3:
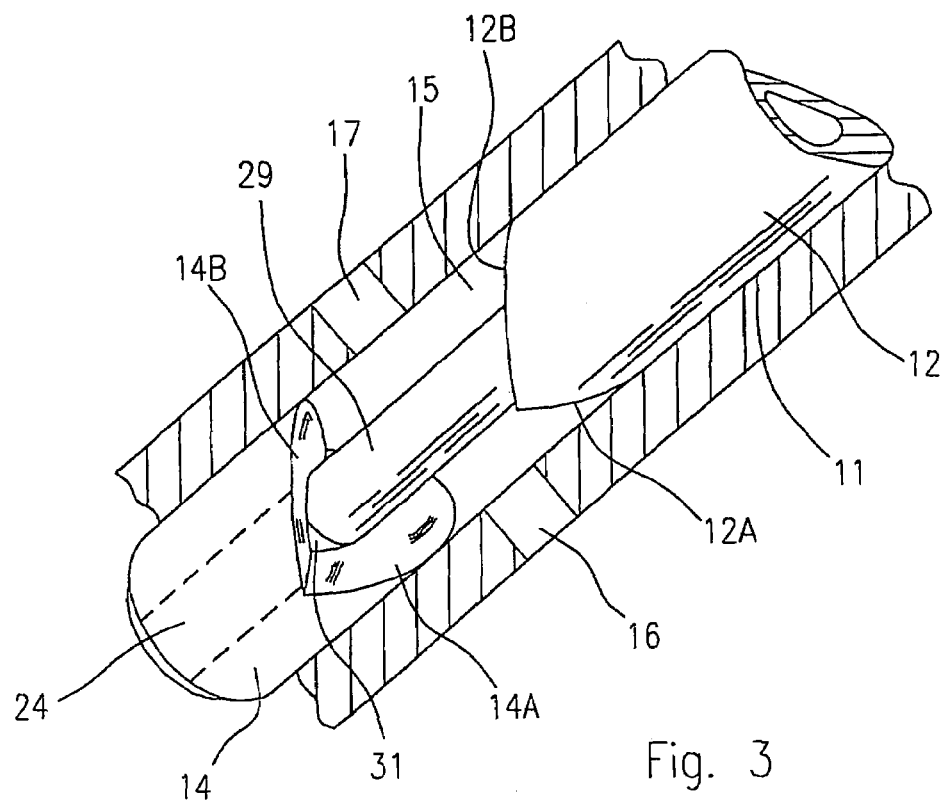
FIG. 3 shows an enlarged detail of FIG. 1, in perspective view.
Figure 4:
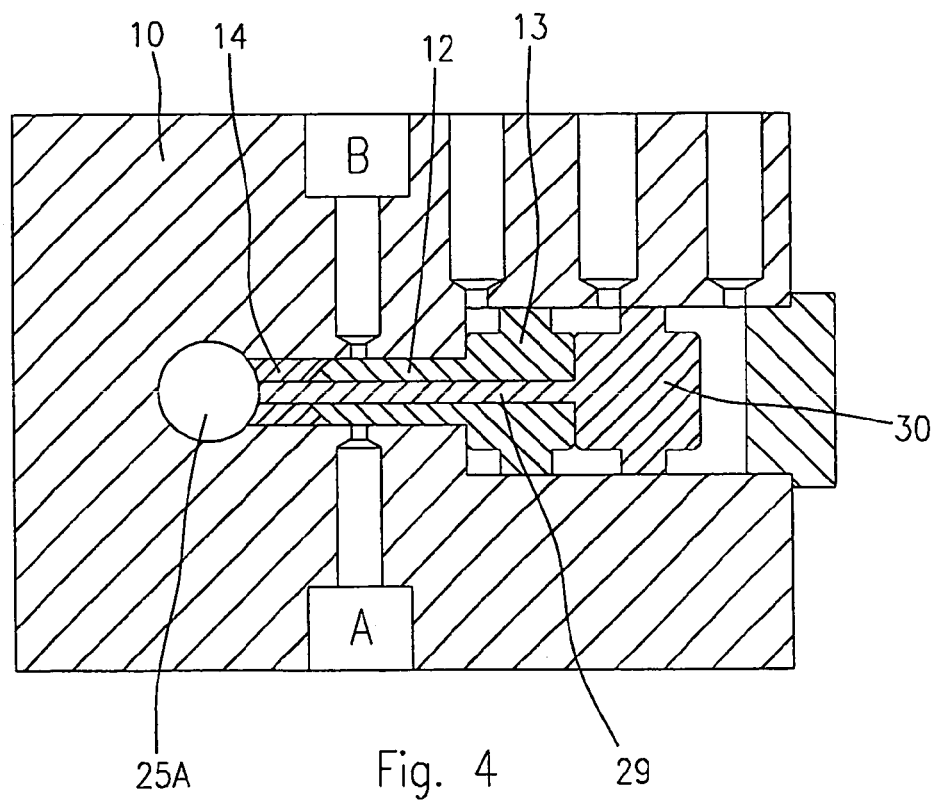
FIG. 4 shows a cross-sectional view, in order to illustrate the closed condition of the apparatus.
Figure 8:
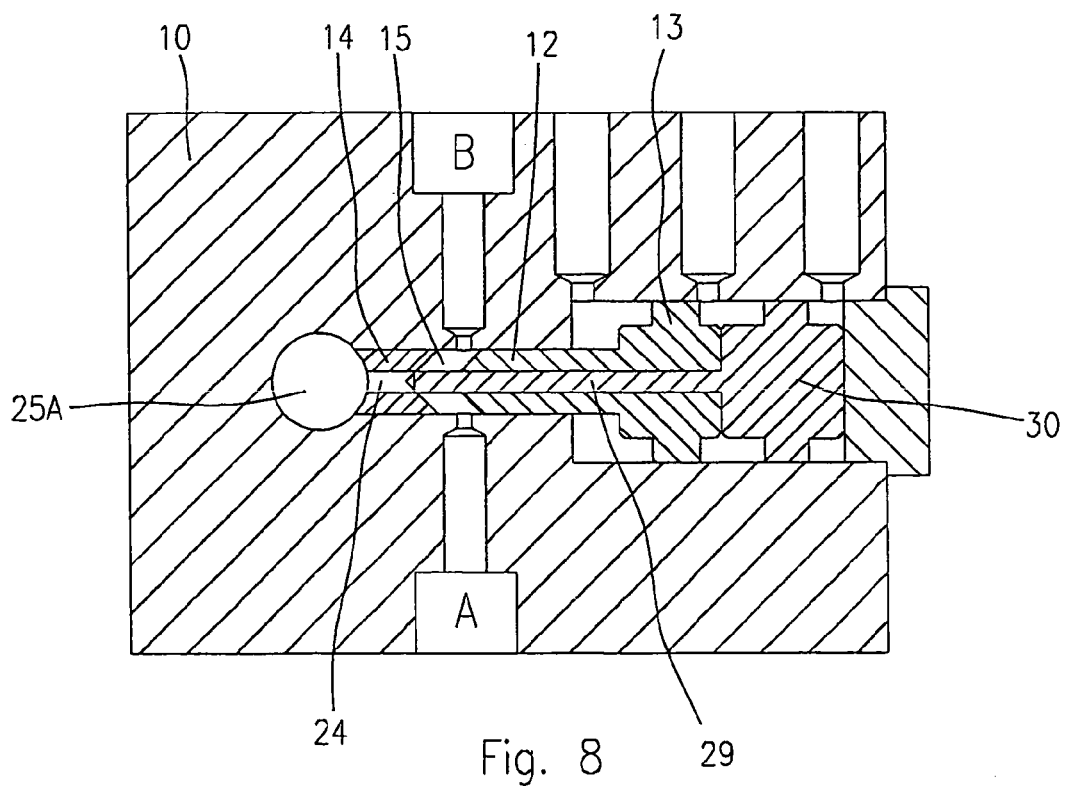
FIG. 8 shows a cross-sectional view similar to that of FIGS. 4 and 6 in the feeding condition.

As shown in the FIGS. 1 to 3, the apparatus comprises a body 10 made in one or several parts, having a hole 11 through which a spool member 12 can reciprocate; the latter is in the form of a hollow rod member connected to the piston member 13 of a first hydraulic cylinder 13', to be moved between a forward position shown in FIG. 4, and a backward position shown in FIG. 8.

The fore end the hole 11 is provided with a bush 14 having a shaped rear end, which together with the fore end of the hollow spool member 12, in the condition of FIGS. 1, 2, 3 and 9, forms a first chamber 15, also referred to as common pressure and feeding chamber for chemical components, into which inlet apertures 16 and 17 for the introduction of two chemical components A and B open out at the ends of respective feeding ducts. The components A and B are delivered and fed in a stoichiometrically proportioned ratio by respective positive displacement pumps, capable of supplying the required quantity, at a pressure determined by their flowing through narrow co-injection orifices which, from the common pressure and feeding chamber 15 open out into a small mixing chamber 24. The components A and B are introduced into the common pressure and feeding chamber, where they remain in an substantially unmixed or jumbled condition, at a same pressure, and from where they are made to flow towards one or more co-injection orifices opening into the mixing chamber 24.

As previously mentioned, a stationary bush 14 is disposed at the fore end of the hole 11; the bush 14 defines a cylindrical mixing chamber 24 having a cross-sectional area considerably smaller than that of the common pressure and feeding chamber 15, as well as smaller than that of a mixing chamber of conventional type; for example its cross sectional dimensions can be ten time smaller, compared to the dimensions of the mixing chamber of conventional apparatuses.

In the example shown, the mixing chamber 24 in turn opens out into a third chamber 25A of greater diameter, also referred to as post-mixing chamber extending into an outlet duct 25B for delivering the resulting reactive mixture. As shown in FIG. 1, the chamber 25A and the outlet duct 25B are disposed at an angle of 90° in respect to the mixing chamber 24; as an alternative, they can be disposed in the same plane or slant with respect to the longitudinal axis of the mixing chamber 24.

A cleaning member 26 longitudinally slides into the chamber 25A and along the outlet duct 25B; the cleaning member 26 is connected to the piston member 27 of a piston-cylinder arrangement of a hydraulic control cylinder 28 to be moved between a backward position, in which it opens the outlet of the mixing chamber towards the post-mixing chamber and the outlet duct, and a forward position in which it ejects the residual mixture which remains in the chamber 25A and in the duct 25B at the end of each mixing and delivery step.

Figure 5:
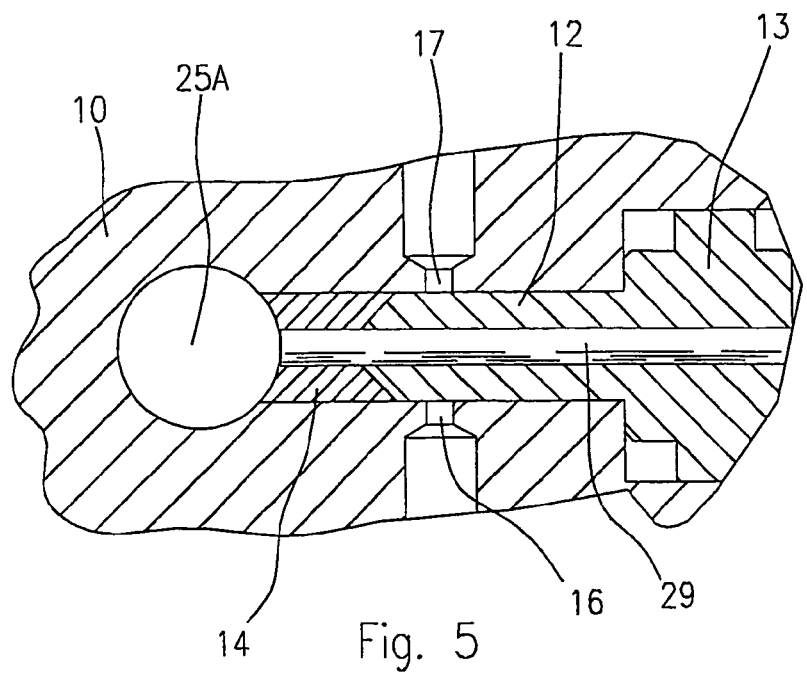
FIG. 5 shows an enlarged detail of FIG. 4.

The apparatus also comprises a cleaning member for the mixing chamber 24; this cleaning member consists of a pin member 29 connected to the piston member 30 of a piston-cylinder arrangement of a respective hydraulic control cylinder 30', to be moved between a forward position for cleaning the mixing chamber 24, FIGS. 4 and 5, and a backward position for the communication of the jumbling chamber 15 with the mixing chamber 24, FIGS. 6, 7, 8 and 9, in which the shaped fore end of the pin 29 and the correspondingly shaped rear end of the bush 14 define one or more narrow restrictions or orifices for the co-injection into the mixing chamber 24 of the chemical components A and B which flow under pressure, in a substantially unmixed condition from separate feeding ports to the orifices throughout the common pressure and feeding chamber 15, as explained further on.

The two control cylinders for the spool member 12 and the cleaning pin 29 can be separate, or combined with each other into a single operating unit in which the control piston of the piston-cylinder arrangement for the cleaning pin 29 slides within a piston chamber made in the piston member of the control cylinder for the spool 12. In both cases, the two piston chambers can be selectively connected, through suitable passages, to a common fluid source to be controlled in sequence, as shown in the various figures of the accompanying drawings.

The backward position of the cleaning pin 29, is adjustable and can be varied by acting on a stop device 32 for the piston 30, the setting of which can be carried out manually or by means of an electromechanical or electro-hydraulic remote controlled device by an automatic system controlled by a computer or by a programmable logic controller (PLC).

FIG. 3 of the accompanying drawings more clearly shows the main feature of the apparatus of FIG. 1, in a working condition to allow the feeding and introduction of the chemical components A and B into the common pressure and feeding chamber 15 which is common to the various components, and for subsequent differentiated mixing steps. In particular performs a first feeding step for the introduction of the various components into the common pressure and feeding chamber 15, from where the resulting jumbled components flow in a substantially unmixed or untidy condition, at a same common pressure, for example at a pressure equivalent to or higher than 30 bars (3 MPa), towards the mixing chamber 24 through one or more narrow co-injection orifices, capable of forming respective jets.

The starting step for introduction of the components into the common pressure and feeding chamber 15 is followed by a first partial mixing which takes place in the jet or jets during the co-injection of the components through each orifice 31, in which the pressure energy existing in the common pressure and feeding chamber 15 is converted into a kinetic energy, which gives rise to a partial turbulent mixing by turbulence along the jets themselves.

This is followed by a second mixing step by collision or impingement between opposite turbulent jets and/or collision against the walls of the mixing chamber 24, where the already partially mixed components undergo a thorough intimate mixing due to the intense turbulence caused by the high kinetic energy of the jets generated by the strong pressure drop, in thin wall, of the injection orifice or orifices provided by the confronting sharp edges of the bush 14 and tip of the pin 29.

As previously specified, the chemical components are to be introduced into a common pressure and feeding chamber in which the components are simply fed in common at a same pressure, to subsequently flow together toward restrictions or orifices where they are co-injected into a mixing chamber, where they undergo a complete intimate mixing, with great hydraulic efficiency, due to the sufficiently high kinetic energy of the jets as to generate a strong turbulence, which improves the mixing degree.

The shapes, characteristics and dispositions of the common pressure and feeding chamber, the mixing chamber, respective flow adjusting and cleaning members, may vary with respect to those shown, while still remaining within the general scope of the invention.

According to a particular embodiment, shown in the figures from 1 to 3, the common pressure and feeding chamber 15 for the components is formed into the longitudinal hole 11 of the body 10 of the apparatus, or associated part thereof, and is delimited by the opposite shaped ends of the spool 12 and the bush 14 defining the bottom of the common pressure and feeding chamber 15, as shown; in particular, the pin 29 for throttling the flow and cleaning the mixing chamber 24, which axially extends into the hole 11, contributes to form an annularly-shaped common pressure and feeding chamber 15 between the opposite side surfaces.

Figure 9:
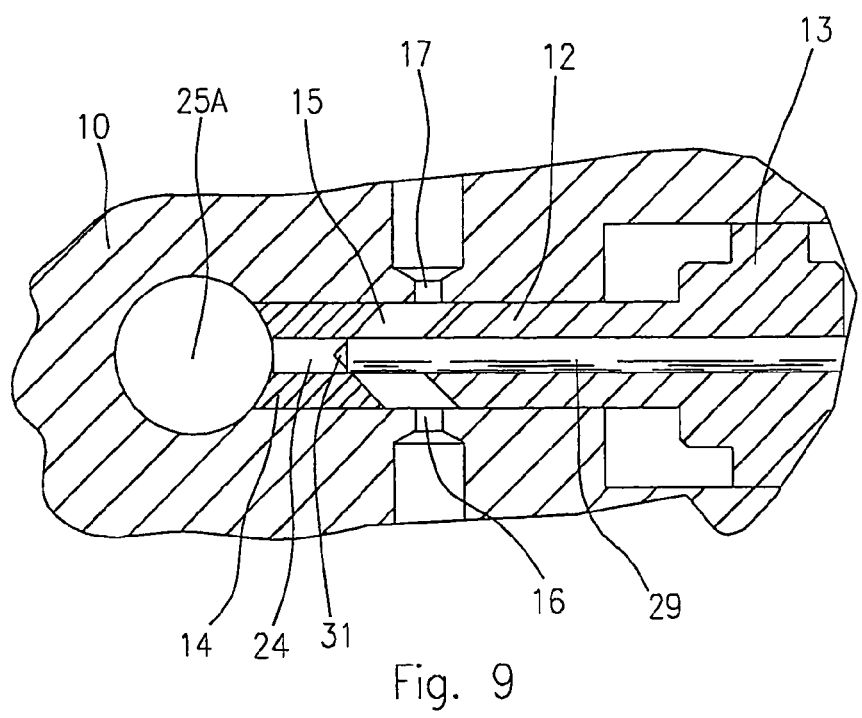
FIG. 9 shows an enlarged detail of FIG. 8.

More particularly, as shown in the enlarged details of FIG. 3 and FIG. 9, the opposite ends of the spool member 12, and of the bush 14 are similarly V-shaped so as to provide two surfaces 12A, 12B slanting at 45°, with respect to a plane passing through the longitudinal axis, and respectively two similarly slanting surfaces 14A, 14B which are reciprocally matching with each other. In the example shown, the surfaces 14A, 14B converge forward towards the mixing chamber, both in order to form, with the front surfaces of the pin 29, the narrow orifices 31 for the co-injection of the components A and B, and to facilitate cleaning by the ejection of the residue of the chemical material which remains in the chamber 15 at the end of each operative step. This can be achieved by bringing the movable spool member 12 close to and urging the same against the end of the bush 14; however, an opposite or reversed disposition of the aforesaid surfaces, with respect to that shown, is not excluded.

Also in FIG. 3 it can be seen that the pin 29 in its backward position extends within the common pressure and feeding chamber 15, with the fore end of said pin 29 partially penetrating, for a very brief length, into the rear end of the mixing chamber 24; in particular, the fore end of the pin 29 comes to rest in a slightly backward position with respect to the corner formed by the V-shaped surfaces at the rear end of the bush 14, corresponding to the intersection line of the two slanting surfaces 14A and 14B, to form two diametrically opposite narrow triangular slits 31, only one of which is shown in FIG. 3, delimited by opposite sharp edges. Consequently, the chemical components into the common pressure and feeding chamber 15 are co-injected simultaneously into the mixing chamber 24, through the orifices 31 which gives rise to a sharp pressure drop which in turn generates a strong turbulence in the jets along which a partial mixing takes place, followed by a second intimate mixing by impingement and related turbulency, between the jets and/or collision against the walls of the mixing chamber itself. The resulting reactive mixture then flows from the mixing chamber 24 towards the post-mixing chamber 25A and/or into the outlet duct 25B.

From tests carried out, the solution of FIG. 3 proves to be highly efficient in that the two chemical components A and B simply introduced in an unmixed condition into the common pressure and feeding chamber 15, flowed under pressure towards the orifices 31 through which they were partially mixed in the jets as they were co-injected into the chamber 24. By changing the aperture of the orifices 31, for example by adjusting the position of the pin 29, acting on an adjustable stop member 32 for the piston 30 of the hydraulic control cylinder, it was possible to change the pressure inside the common pressure and feeding chamber 15 and the pressure drop on the orifices 31; consequently the pressure drop and the kinetic energy of the jets may be changed in order to obtain, in an extremely simple way, perfectly balanced co-injection conditions for a better, more efficient and transient free mixing.

The chemical components A and B can be made to flow from storage tanks, along respective feeding lines, towards the common pressure and feeding chamber 15, at a same pressure, or at different pressure values, according to the required quantities and characteristics of the components themselves; in any case, the various components will flow in the common feeding chamber 15 at a same pressure resulting from the pressure drop caused by the injection orifices 31, and will consequently be co-injected at a same pressure, with jets of identical flow rate and speed.

The figures from 4 to 9 schematically show the basic steps of the co-injected mixing method according to the invention, and the main operative conditions of the apparatus previously described with reference to the figures from 1 to 3.

In particular, the FIGS. 4 and 5 show the movable cleaning or spool member 12 of the common pressure and feeding chamber 15 and the cleaning pin 29 for the mixing chamber 24 in their fully forward condition, in which they close the inlet ports 16 and 17, and clean the common pressure and feeding chamber 15 and the mixing chamber 24.

In this condition, the slanting surfaces 12A and 12B at the fore end of the movable spool member 12 are urged against the corresponding slanting surfaces 14A and 14B at the rear end of the bush 14 of the mixing chamber, while the cleaning pin 29 extends totally into the hole of the mixing chamber 24.

Figure 6:
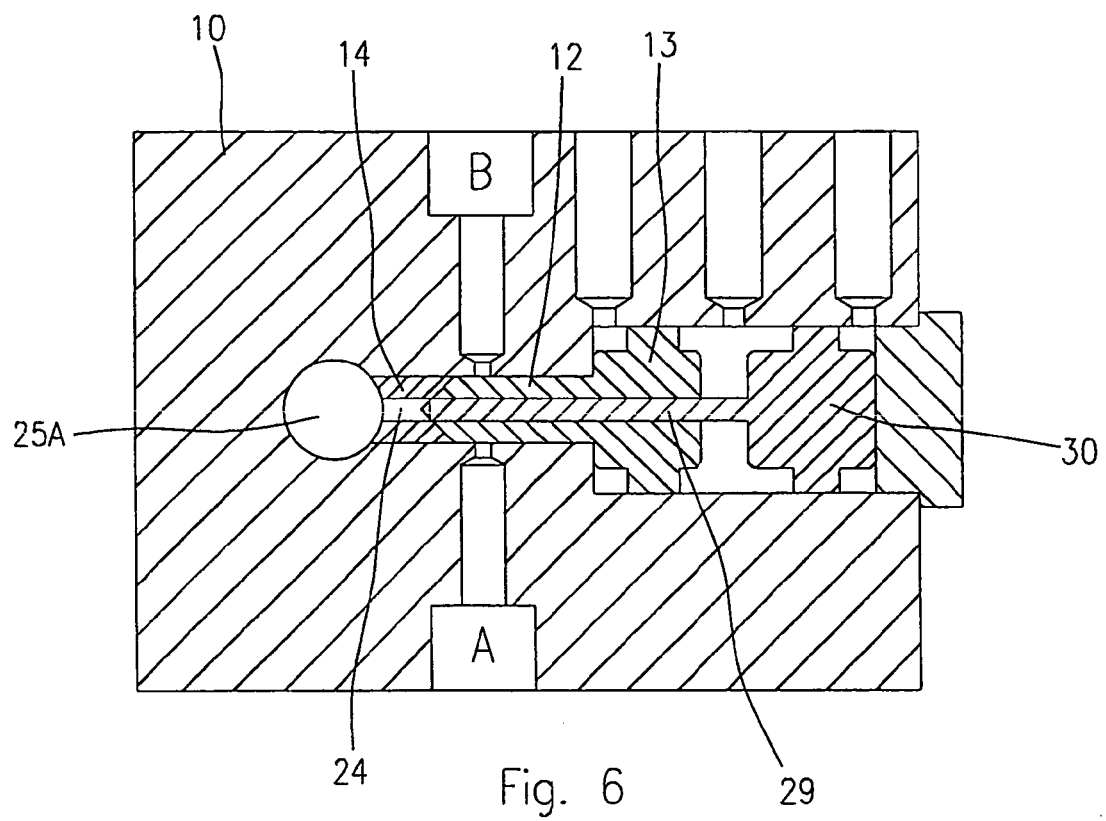
FIG. 6 shows a cross-sectional view similar to that of FIG. 4, in the open condition of the apparatus.
Figure 7:
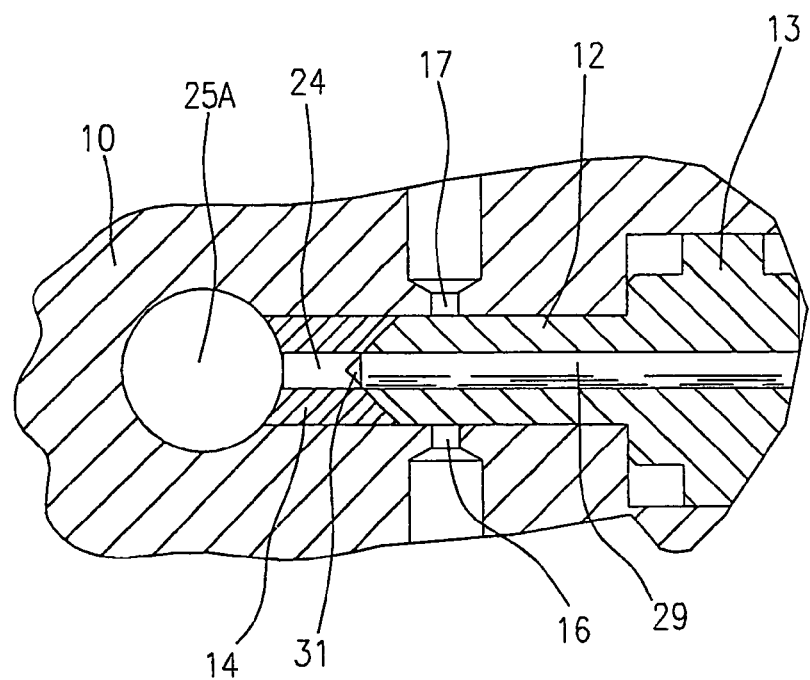
FIG. 7 shows an enlarged detail of FIG. 6.

In order to start an operative cycle, from the conditions of FIGS. 4 and 5, it is first necessary to move backwards the pin 29, stopping it in the position shown in FIGS. 3, 6 and 7, in which it opens the orifices 31 towards the mixing chamber 24.

In this condition, the spool member 12 is still fully forward against the bush 14 keeping closed the ports 16 and 17 for the inlet of the components A and B, which can consequently be made to recirculate at a pre-established pressure value, by means of appropriate outer valves, not shown, or in any other per se known way, towards their storage tanks.

Upon completion of the component recycling step, the subsequent step contemplates the backward movement of the spool 12 and the opening of the inlet ports or apertures 16 and 17 towards the common pressure and feeding chamber 15 which is thus formed between the opposite end of the movable spool 12 and the bush 14.

The two components A and B are now introduced, in suitably metered quantities, into the common pressure and feeding chamber 15 from where they flow together, in an unmixed and pressurised condition, towards and through the narrow orifices 31 so as to be co-injected into the mixing chamber 24; due to the high intrinsic turbulency of the jets, and due to the energy generated by the same jets which impinge with one another in the mixing chamber 24, the components A and B are thoroughly mixed, and then flow into the post-mixing chamber 25A and into the outlet duct 25B.

Upon completion of the mixing and delivery steps, it is first necessary to move the spool 12 forward so as to eject and squeeze out the residue of the component material remaining in the chamber 15 (FIGS. 6 and 7), and then move forward the cleaning pin 29 which in turn ejects the residual mixture from the mixing chamber 24, towards the chamber 25A (FIG. 5), from where in turn it will be ejected by the rod 26 for cleaning the outlet duct 25B.

Figure 10:
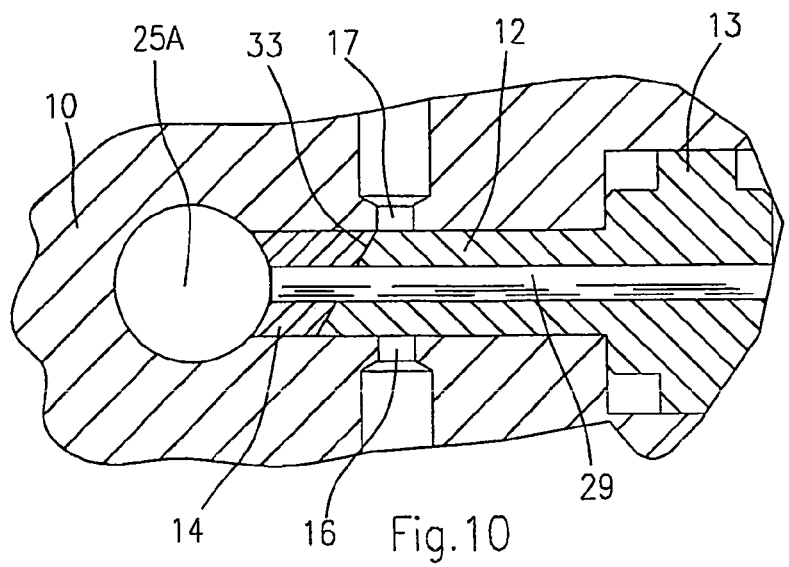
FIGS. 10, 11 and 12 show enlarged details similar to those of FIGS. 5, 7 and 9 for a second preferential embodiment.
Figure 11:
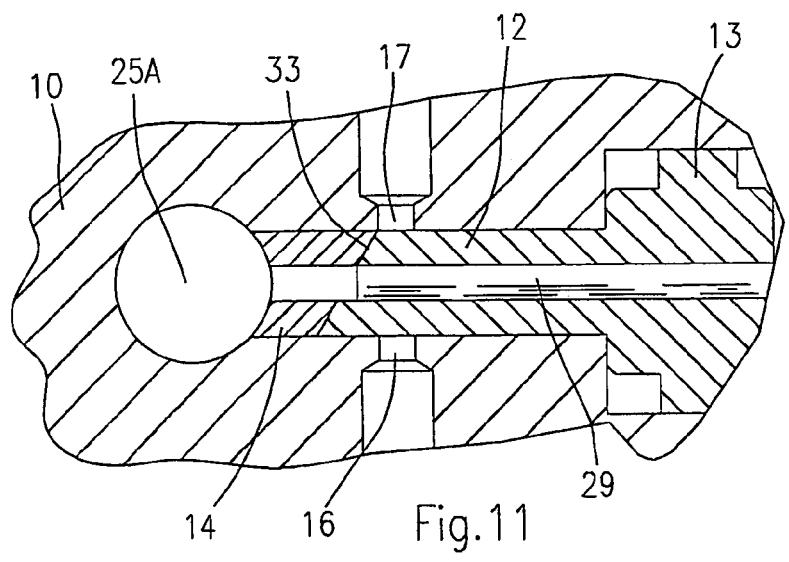
Figure 12:
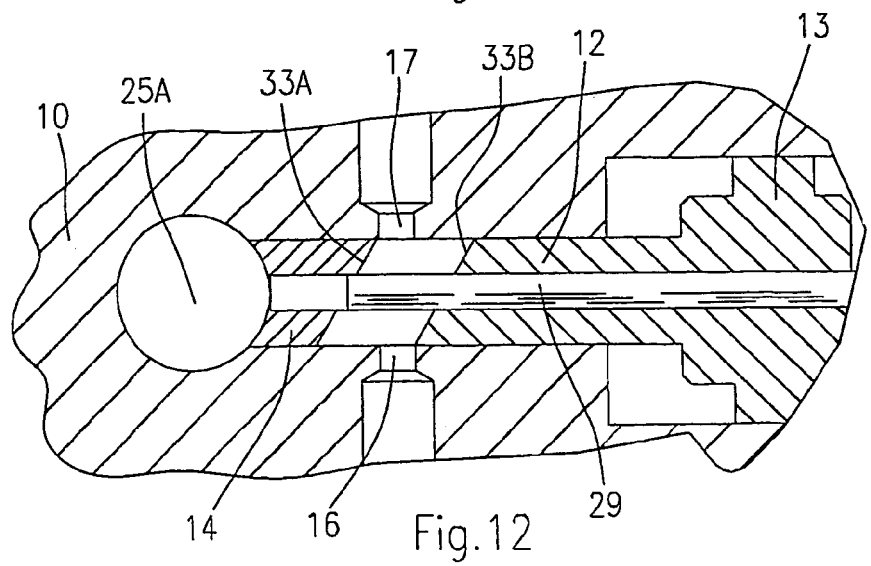
Figure 13:
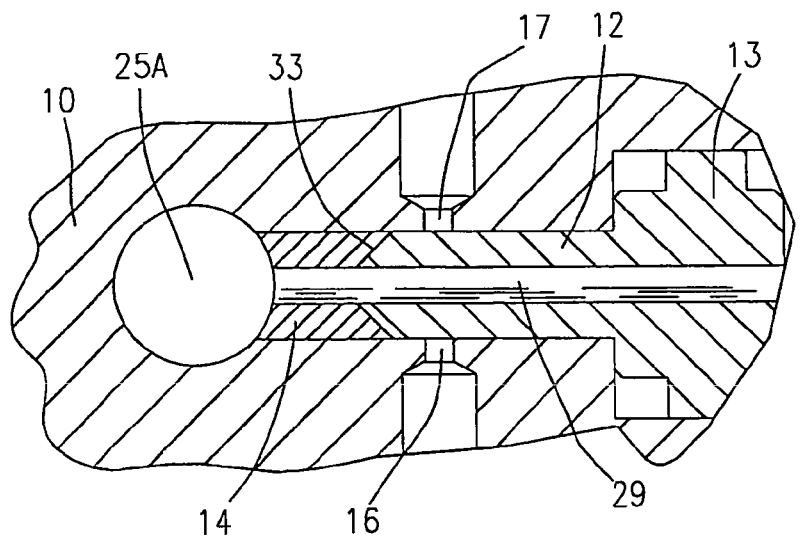
FIGS. 13, 14 and 15 show enlarged details similar to those of the previous figures, for a third embodiment.
Figure 14:
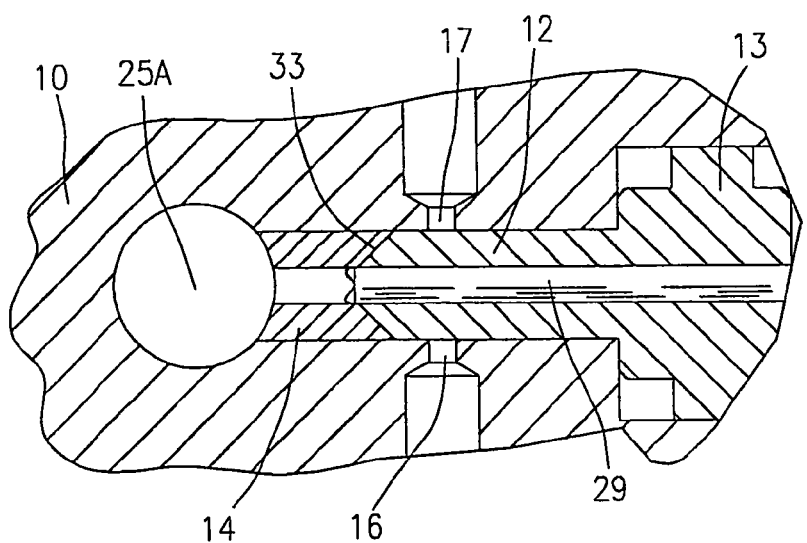
Figure 15:
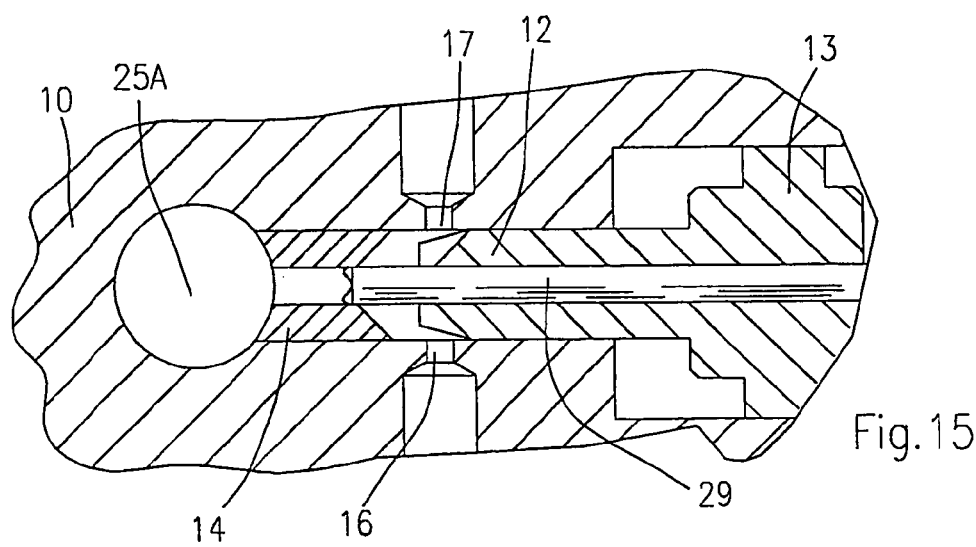

The FIGS. 10, 11 and 12 represent conditions identical to those of the previous FIGS. 5, 7 and 9 for a different embodiment; in this case, the movable spool 12 and the fixed bush 14 are cut on a single slanted plane 33 with respect to their longitudinal axes. Therefore, in this case, the common pressure and feeding chamber 15 will be defined by the slanted surfaces 33A, 33B which extend parallel to each other, forming an angle of 45°, or an angle ranging from 15° to 75° with respect to the longitudinal axis of the chamber 15. In these case, the same reference numbers of the previous figures have been used to indicate similar or equivalent parts.

The operative method of the apparatus of FIGS. 10-12 is wholly identical to that of the apparatus of the previous figures, to which it is consequently referred.

The FIGS. 13, 14, 15 and 16 show a third embodiment substantially similar to that of the previous figures, which has been modified in the shape of the opposite ends of the spool member 12 and of the fixed bush 14 defining the mixing chamber, to form four jets.

Figure 16:
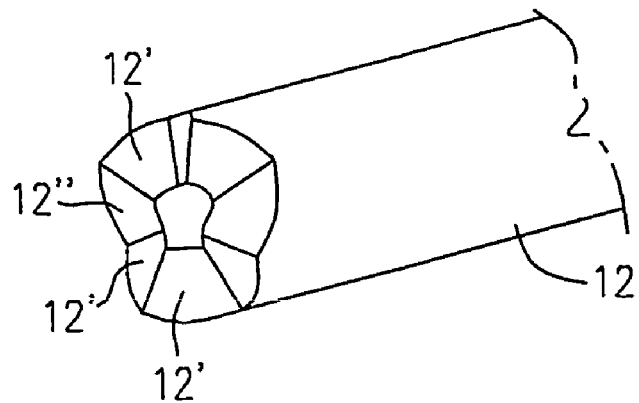
FIG. 16 shows a perspective view of the fore end of the cleaning member of the common pressure and feeding chamber for the apparatus, according to the previous figs from 13 to 15.

In this case, the common pressure and feeding chamber 15 can be provided with four inlet ports for four components; consequently, both the tip of the spool member 12 and the rear end of the fixed bush 14 will be provided with crossed V-shaped cuts, or with V-shaped slanting surfaces 12', 12" angularly slanting and circumferentially spaced apart from each other, as for example shown at the fore end of the spool member 12 in the perspective view of FIG. 16.

Here too, the solution of FIGS. 13-16 will operate in a wholly identical way to that described for the previous examples, with the sole difference that now four narrow co-injection orifices, in opposite pairs, are formed, together with the corresponding formation of four jets which will be injected into the mixing chamber 24.

The same reference numbers have been used also in FIGS. 13, 14, 15 and 16 to indicate parts similar or equivalent to the previous examples.

Figure 17:
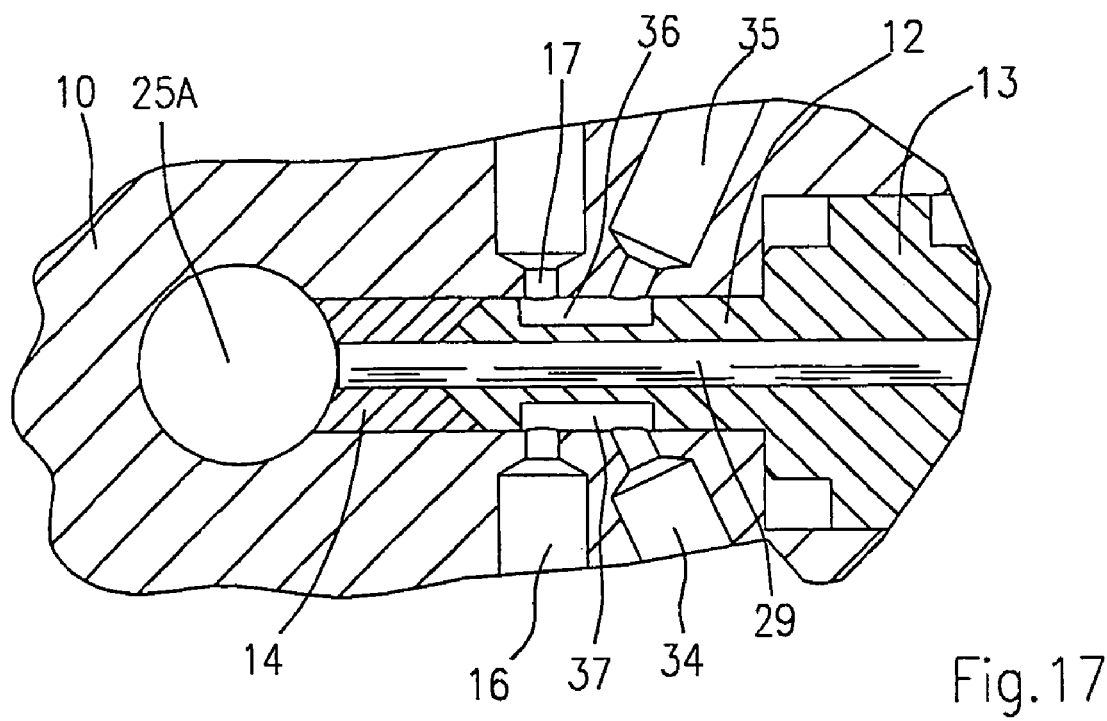
FIGS. 17, 18 and 19 show enlarged details similar to those of FIGS. 5, 7 and 9 in order to illustrate a further feature of the apparatus according to the invention.
Figure 18:
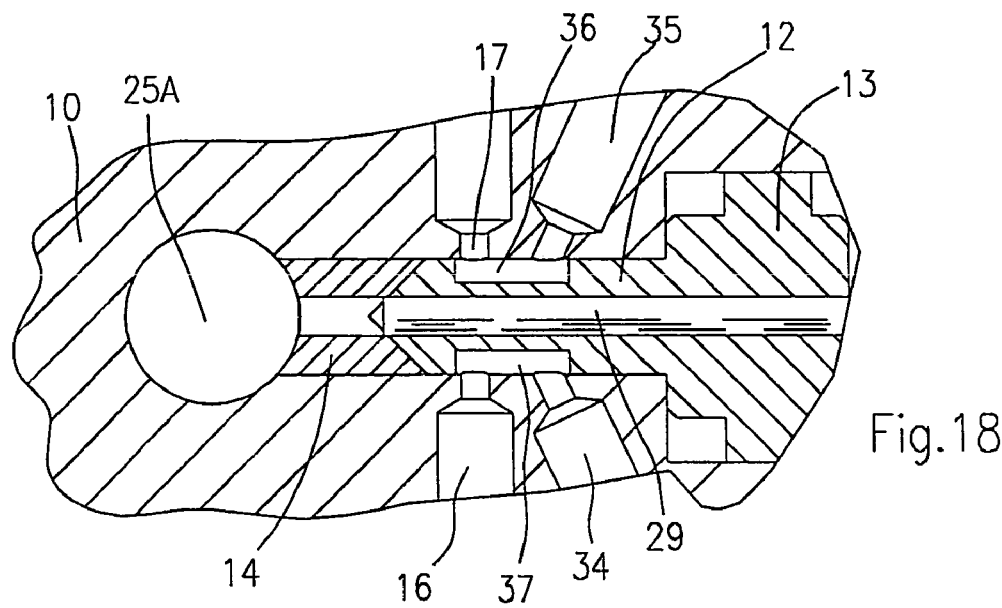
Figure 19:
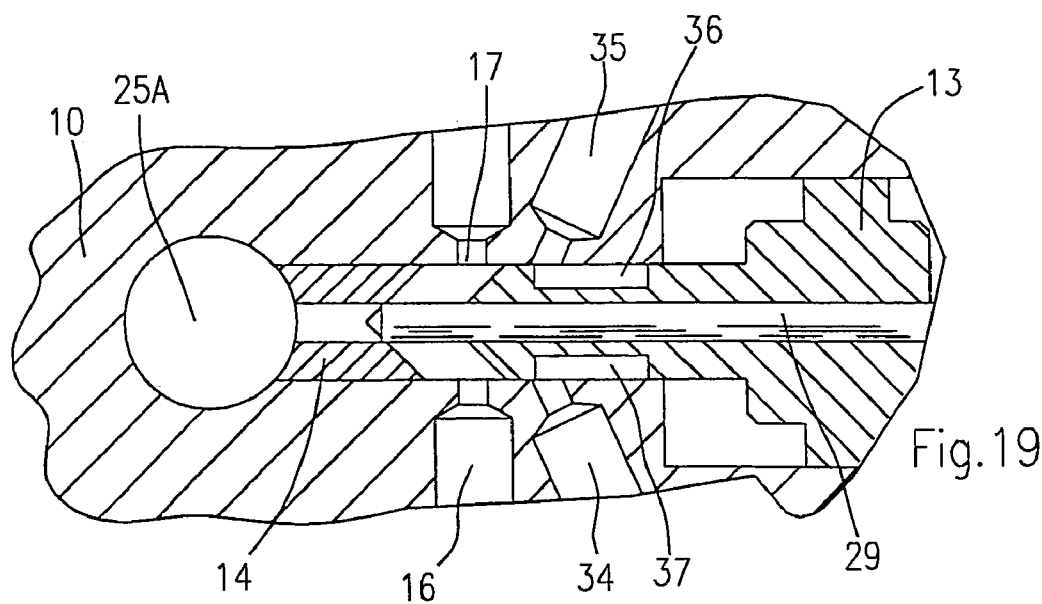

FIGS. 17, 18 and 19 show a fourth embodiment similar to that of FIGS. 5, 7 and 9 which has been modified to obtain an internal recirculation of the components; in the previous cases, the recirculation of the components could be carried out outside the mixing apparatus, by means of an appropriate valve assembly, in a per se known way.

Conversely, in the case of FIGS. 17, 18 and 19, the recirculation is carried out inside the apparatus, for example by providing in a per se known manner a recycling port 34 and 35 in correspondence with each inlet port 16 and 17, and by providing the movable spool 12 with longitudinal slots 36 and 37, to flow each component between inlet ports 16, 17 and recirculation ports 34, 35.

With the exception of the recirculation step, the apparatus of the example shown in FIGS. 17, 18 and 19, again operates in an identical way to that of the previous examples. Therefore, the same reference numbers have again been used to indicate similar or equivalent parts.

Figures from 1 to 19 show some of the numerous possible embodiments of mixing apparatuses suitable for carrying out the co-injection method according to the invention; it is obvious however that other solutions are possible within the scope of this invention.

For example, the post-mixing chamber 25A and the delivery duct 25B of FIG. 1 could also be omitted, in which case it would be necessary to suitably extend the length of the mixing chamber 24 to prevent the outflow of a turbulent jet.

It would also be possible to contemplate a different disposition and orientation of the mixing chamber 24 with respect to the chamber 25A and to the outlet duct 25B. In the case of FIG. 1, the longitudinal axis of the mixing chamber 24 is at right angles with and on the same plane as the longitudinal axis of the chamber 25A; however, other dispositions are possible in which the axis of the mixing chamber 24 is disposed in a different plane, or to one side of the axis of the chamber 25A, or an angularly slanted disposition of the chamber 24, with respect to the chamber 25, towards the cleaning pin 29 so that the stream of the mixture flowing out of the mixing chamber is in counter-current, or in the opposite direction to the flow of the mixture in the outlet duct 25B.

In this case, the tip end of the pin 29 would be cut on a bias with respect to its longitudinal axis and the bottom end of the common pressure and feeding chamber would be flat or V-shaped.

From what has been described and shown, it will be clear that what is provided is a procedure and a new self-cleaning apparatus for mixing reactive chemical components in the production of rigid or flexible polyurethane foams, or moulded parts in polyurethane material, which make use in a new and original way of the principle of mixing by turbulency and collision or impingement; in fact, unlike the conventional apparatuses, where the components are injected separately at high kinetic energy into the mixing chamber and where their mixing can start only after the single jets of the components have crossed and impinged with one another, according to this invention, thanks to the use of a common pressure and feeding chamber shared by the various chemical components to be mixed, the mixing starts during the same co-injection of the components from the narrow orifices which open out into the mixing chamber, due to the swirling motion of the jets, and by successive impingement, thereby achieving an efficient final mixing.

Moreover, the pressure of the various jets can be controlled simultaneously by operating a single adjusting member consisting of the same cleaning pin 29 for the mixing chamber. Lastly, the mixing chamber can have a cross-sectional area considerably smaller than that of a conventional apparatus of the same capacity, thereby further increasing the efficacy of the mixing.

It is understood however that what has been described and shown in the various figures has been given purely by way of example in order to illustrate the invention, and that other modifications and variations may be made without thereby deviating from the scope of what is claimed herein.

The invention claimed is:

1. A method for mixing chemically reactive liquid chemical components (A, B) into a mixing device (10), for production of polyurethane foams and moulded parts, in which metered quantities of a first (A) and at least a second (B) chemically reactive components are fed under pressure conditions into a first chamber (15) and made to flow into a second chamber (24) through at least one injection orifice (31), said method comprising:
   providing an annularly shaped common pressure and feeding chamber (15);
   feeding metered quantities of the chemical components (A, B) into the annularly shaped common pressure and feeding chamber (15) common to the chemical components (A, B), provided by said first chamber of the mixing device (10)
   maintaining the chemical components (A, B) inside the feeding chamber (15) in an unmixed state and at a same pressure condition, while they are flowing toward the at least one restriction or orifice (31);
   co-injecting the unmixed chemical components (A, B) feed in common, into a mixing chamber (24) provided by said second chamber (24), through said least one injection orifice (31); and
   causing a first mixing of the co-injected chemical components (A,B) by turbulency during co-injection, and a second intimate mixing by impingement and turbulency into the mixing chamber (24) of the mixing device (16).

2. The method according to claim 1, comprising the additional step of pre-mixing the chemical components by the turbulency of a jet during the co-injection.

3. The method according to claim 1, wherein the chemical components (A, B) are co-injected into the mixing chamber (24) provided by said second chamber, while maintaining in the common pressure and feeding chamber (15) a pressure equal to or higher than 30 bars (3,0 Mpa).

4. The method according to claim 3, wherein the pressure in the common pressure and feeding chamber (15) is ranging from 40 to 160 bars (4 to 16 Mpa)

5. The method according to claim 1, in which the mixing second chamber (24) is provided with a rear open end, and a flow throttling member (29) having a shaped end axially protruding into the rear opening of the mixing chamber (24) to provide said at least one injection orifice (31), wherein the pressure of the common fed chemical components (A, B) in the common pressure and feeding chamber (15) is changed by adjusting the axial position of the throttling member (15) shaped end in respect to the rear opening of the mixing chamber (24).

6. The method according to claim 1, comprising the step of post-mixing of the resulting mixture outcoming from the mixing second chamber (24).

7. A mixing device for mixing reactive chemical components (A, B), having:
   a mixing chamber (24) and an outlet duct (25B); characterized by comprising:
   an annularly shaped common pressure and feeding chamber (15) in fluid communication with said mixing chamber (24);
   said common pressure and feeding chamber (15) having inlet apertures (16, 17) for separate feeding of the chemical components (A, B), and being conformed for maintaining the flowing of the chemical components (A, B), in common, at a same pressure and in unmixed state;
   at least one injection orifice (31), conformed and arranged for co-injection of the chemical components (A, B), from the common pressure and feeding chamber (15) into the mixing chamber (24) of the mixing device (10); and
   a throttling member (29) for the at least one injection orifice (31) coaxially arranged inside the feeding chamber (15), said throttling member (29) having a fore end partially protruding into an inlet aperture of the mixing chamber (24), and conformed to provide said at least one injection restriction or orifice (31) between opposite edges of inlet aperture of the mixing chamber (24) and the fore end of throttling member (29).

8. The mixing device according to claim 7, wherein the opposite confronting faces at the bottom of the feeding chamber (15) and of the fore end of the throttling member (29) are provided with shaped surfaces defining said at least one injection restriction or orifice (31).

9. The mixing device according to claim 7, wherein the throttling member (29) is axially adjustable in respect to the inlet aperture of the mixing chamber (24).

10. The mixing device according to claim 7 comprising a cleaning member (29) axially movable within the mixing chamber (24).

11. The mixing apparatus according to claim 10, wherein the cleaning member (29) is consisting of a throttling member (29).

12. The mixing device according to claim 11, wherein the cleaning and throttling member (29) is movable between an advanced and a retracted position in respect to the mixing chamber (24), and means for adjusting the axial position of the throttling member (29) and to change the sectional area of the injection orifice (31) at the retracted position of the throttling member (29).

13. The mixing device according to claim 7, wherein the common pressure and feeding chamber (15) and the mixing chamber (24) are axially aligned.

14. The mixing device according to claim 7, wherein the mixing chamber (24) has a cross sectional area smaller than that of the common pressure and feeding chamber (15).

15. The mixing device according to claim 7, wherein the mixing chamber (24) opens out into a post-mixing chamber (25A).

16. The mixing device according to claim 15, wherein the post-mixing chamber (25A) is angularly oriented, with respect to the mixing chamber (24).

17. A The mixing device according to claim 16 wherein the post-mixing chamber (25A) is arranged in a different plane.

18. The mixing device according to claim 15, wherein the post-mixing chamber (25) has a cross sectional area larger than that of the mixing chamber (24).

19. The mixing device according to claim 15, wherein the axis of the post-mixing chamber (25A) forms an angle ranging from 45° to 150° with the axis of the mixing chamber (24).

20. The mixing device according to claim 7, comprising a cleaning member (12), axially movable within the common pressure and feeding chamber (15).

21. The mixing device according to claim 20 wherein the feeding chamber (15) is provided with axially spaced apart inlet and outlet apertures (16, 34; 17, 35) for feeding and recycling of the chemical components (A, B), the cleaning member (12) for the common pressure and feeding chamber (15) comprising a spool member conformed for opening and closing said inlet apertures (16, 17), respectively for connecting said inlet apertures (16, 17) with the outlet apertures (34, 35) for recirculation of the chemical components (A, B).

22. The mixing device according to claim 21, wherein said spool member (12) comprises re-circulation slots (36, 37).

23. The mixing device according to claim 20, wherein the cleaning member (12) for the common pressure and feeding chamber (15) consists of a hollow spool member (12) having a longitudinal bore, and wherein a throttling member (29) is provided comprising an elongated pin member axially movable within the bore of said spool (12).

24. The mixing device according to claim 23, wherein the spool member (12) for cleaning common pressure and feeding chamber (15) and the cleaning member (29) for the mixing chamber (24), are connected to selectively operable hydraulic control actuators (13, 30).

25. A mixing device according to claim 7, comprising:
a body (10) having an elongated hole and a common pressure and feeding chamber (15) for the chemical components (A, B) in said elongated hole, said common pressure and feeding chamber (15) having inlet apertures for chemical components;
a bush member (14) at the fore end of said elongated bole, said bush member (14) defining the mixing chamber (24); and;
a spool member (12) axially sliding in said feeding chamber (15), operatively connected to a first hydraulic control cylinder (13);
the opposite ends of the bush member (14) and the spool member (12) having reciprocally matching facing surfaces (12A, 12B; 14A, 14B; 33A, 33B).

26. The mixing device according to claim 25 wherein the opposite ends of the bush member (14) and the spool member (12) have at least one, facing surface parallel arranged to a same slanting plane.

27. The mixing device according to claim 26, wherein said slanting plane forms an angle ranging from 15° to 75° with respect to the longitudinal axis of a jumbling chamber (15).

28. A self cleaning mixing apparatus for mixing at least first and second reactive polyurethane-forming chemical components, comprising: a body (10) having a first longitudinal bore (11) wherein a common pressure and feeding chamber (15); for feeding in common the chemical components (A, B) and a mixing chamber (24) are provided in said first longitudinal bore (11), the mixing chamber (24) having a rear open end provided with slanted shaped edges;
at least first and second inlet apertures (16, 17) for the chemical components (A, B), opening into said feeding chamber (15);
a first cleaning and spool member (12) for the common pressure and feeding chamber (15) slidably received within said first longitudinal bore (11) to move between a closed and an open condition of the inlet apertures (16, 17) of the feeding chamber (15);
wherein a second cleaning member (29) for the mixing chamber (24) is slidably received and protrudes from a longitudinal bore in said spool member (12), said second cleaning member (29) being movable between an advanced and a retracted position in respect to the mixing chamber (24); and
wherein at least one injection restriction or orifice (31) is performed between the shaped edges at the rear end of mixing chamber (24) and front shaped edges of the second cleaning member (29) for co-injection of the not yet mixed chemical components from the feeding chamber (15) into the mixing chamber (24) of the mixing apparatus.

29. The self-cleaning apparatus according to claim 28, comprising first and second hydraulic actuators (13, 13'; 30, 30') operatively connected to said first and second cleaning members (12, 29) and selectively connectable a fluid source.

30. The self-cleaning apparatus according to claim 28, wherein said hydraulic actuators comprises first and second cylinder-piston arrangements (13, 13'; 30, 30'), each of the said cylinder-piston arrangement comprising a piston chamber (13', 30') and a piston member (13, 30), and wherein the piston chamber (30') of the second cylinder-piston arrangement (30, 30') is provided in the piston member (13) of said first cylinder-piston arrangement (13, 13').

31. The self-cleaning apparatus according to claim 28 comprising a throttling device for throttling the injection orifice (31), said throttling device comprising the second cleaning member (29) for the mixing chatter (24) and adjustable stop means (32) at the retracted position of the second cleaning member (29).

* * * * *